United States Patent [19]

Fürst et al.

[11] Patent Number: 4,466,658
[45] Date of Patent: Aug. 21, 1984

[54] CRANK DRIVE

[75] Inventors: Arpad Fürst, Munich; Horst Bienert, Gauting; Georg Kohlpaintner, Martinsried, all of Fed. Rep. of Germany

[73] Assignee: Webasto-Werk W. Baier GmbH & Co., Gauting, Fed. Rep. of Germany

[21] Appl. No.: 462,425

[22] Filed: Jan. 31, 1983

[30] Foreign Application Priority Data

Apr. 14, 1982 [DE] Fed. Rep. of Germany ....... 3213708

[51] Int. Cl.³ .............................................. B60J 7/02
[52] U.S. Cl. ................................... 296/223; 296/221; 296/222; 74/804; 74/526; 74/527; 74/547
[58] Field of Search ............. 296/216, 221–223; 74/804, 805, 526, 547, 527

[56] References Cited

U.S. PATENT DOCUMENTS

| 3,763,710 | 10/1973 | Kouth et al. | 296/223 |
| 3,948,119 | 4/1976 | Schlapp | 74/805 |
| 4,113,304 | 9/1978 | Leiter | 296/223 |

Primary Examiner—Robert B. Reeves
Assistant Examiner—Dennis H. Pedder
Attorney, Agent, or Firm—Antonelli, Terry & Wands

[57] ABSTRACT

A crank drive for the control of the sliding movement and of the tilting movement of the cover of sliding-lifting roofs of motor vehicles. A crank is provided that is rotatably disposed on a support to be mounted in a stationary manner, with said support having an internal toothing that is concentric with respect to the rotating axis of the crank, a toothed ring having an external toothing being in mating engagement with said internal toothing. The toothed ring is disposed on an eccentric firmly connected with the crank, with respect to rotation, so that it can be rotated around an axis which, with respect to the rotating axis of the crank, is radially displaced by an amount that is about equal to the difference of the tooth-root circle radii. A first stop arrangement for limiting the rotating movement of the crank in crank positions corresponding to the fully pushed-back and the fully tilted-out position of the cover is firmly connected with respect to rotation with the toothed ring, while a second stop arrangement for the releasable locking of the crank in the crank position that corresponds to the closed position of the cover is firmly connected with respect to rotation with the support. A crank chamber part concentrically encloses the support, which serves as the bearing body, and houses the toothed ring and the eccentric as well as the stop arrangements.

14 Claims, 13 Drawing Figures

CRANK DRIVE

BACKGROUND AND SUMMARY OF THE INVENTION

The invention concerns a crank drive for controlling the sliding movement and the tilting movement of the cover of sliding-lifting roofs of motor vehicles of the type having an internally toothed crank that coacts with stop means at positions corresponding to fully pushed-back, fully tilted-out and closed positions of the cover.

In the case of a known crank drive of this type (DE-AS No. 23 33 666, corresponding to U.S. Pat. No. 3,948,119), the crank is disposed below a rosette-shaped body forming a crank support, in which a toothed ring and an eccentric (which are rotationally fixed relative to the crank) are housed, the toothed ring and eccentric being, themselves, disposed on a shaft connected with the crank and projecting from said crank. A significant disadvantage of the known crank drive is that it requires a relatively extensive installation space in the vertical direction. However, a requirement for additional space in a vertical direction is especially undesirable because of the fact that a lowering of the $C_d$ value and a resulting flat construction are desired in modern motor vehicles.

The invention is, therefore, based on the task of creating a crank drive of the above-mentioned type that can be installed in a flat manner.

According to the invention, this problem is solved in a simple and excellent manner by means of the fact that the crank chamber concentrically encloses the support (which is developed as a bearing body) and houses the toothed ring and the eccentric, as well as the stop means. The construction according to the invention permits an extremely flat design of the crank drive. Therefore, only a minimum of vertical installation space is required for the crank drive. In addition, an especially compact and convenient shape of the drive is obtained. This drive can, therefore, be housed in an inconspicuous manner. Its assembly is very simple.

Advantageously, the support can be essentially ring-shaped and can be housed in a ring duct of the crank chamber. In this case, the crank chamber may advantageously be rotatably supported on the outside surface of the support as well as by means of a central pivot pin at the, for this purpose, concentric inside surface of the ring borehole. In this manner, a sturdy mounting of the crank is ensured even in the case of an extremely flat construction.

In order to keep the number of the individual components of the crank drive small, the eccentric is preferably rigidly connected with the pivot pin of the crank chamber. In particular, it may be disposed at the bottom of the ring duct.

In a further development of the invention, the toothed ring is connected with a control disk while being fixed in regard to rotation, with the first stop means that interact with the counter-stop means of the support being mounted on said control disk. In this case, the first stop means are preferably formed by a nose of the control disk that projects in an axial direction, said nose engaging in an annular groove of the support forming said counter-stop means and extending over an angle of less than 360°. In this manner, the number of crank turns required to bring the cover into the fully pushed-back or fully tilted position may simply and effectively be limited.

The toothed ring and the control disk may be connected rotationally by means of a carrier, and the control disk may be rotatably disposed around the center of rotation of the crank. However, in principle, it is also possible to combine the toothed ring and the control disk into one single component carrying out a circulating eccentric movement with respect to the internal toothing of the support.

When the toothed ring and the control disk are separate, the control disk is preferably disposed, in an axial direction, resting against the toothed ring on the central pivot pin of the crank chamber. Thus, while, in this case, the toothed ring carries out a circulating eccentric movement, the control disk is, by means of the carrier, caused to carry out a synchronous rotating movement.

A recess in the crank chamber may be provided as the counter-stop means for the second stop means, and the control disk may, in this case, have a control duct shaped in such a way that it only releases the second stop means in the crank position corresponding to the closing position of the cover, for an engagement with the recess of the crank chamber. In this case, the second stop means may, in an especially simple manner, be formed by a stop pin that is disposed in the crank chamber so that it can be radially adjusted, with said stop pin being prestressed to the outside in a springy manner and being provided with a nose engaging into the control duct in order to hold the stop pin against the force of the spring in a position that is radially retracted toward the inside. The control duct has a radial widening that releases the stop pin for engagement in the recess of the crank chamber. In this manner, the crank is reliably and precisely locked in the position that corresponds to the closing position of the cover.

For the optional release of the locking of the crank, a slide is preferably provided which can be operated from the outside of the crank chamber and adjusted in a radial direction, and which is radially prestressed to the outside in a springy manner, by means of which the stop pin can be disengaged from the recess of the crank chamber.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
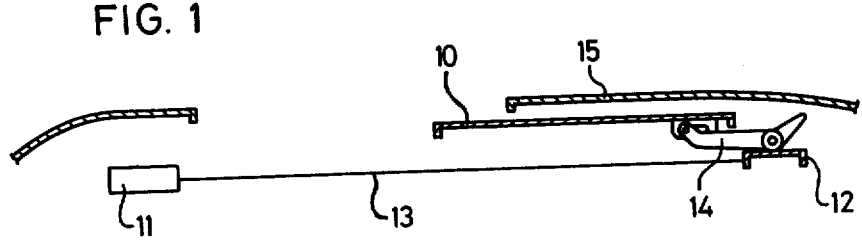
FIG. 1 shows a diagrammatic longitudinal section of a sliding-lifting roof with the cover being pushed back.
Figure 2:
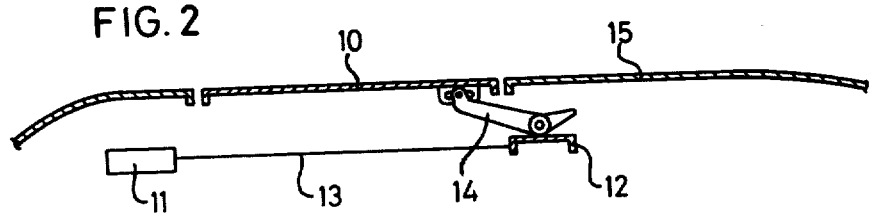
FIG. 2 shows a section corresponding to FIG. 1, with the cover being in a closed position.
Figure 3:
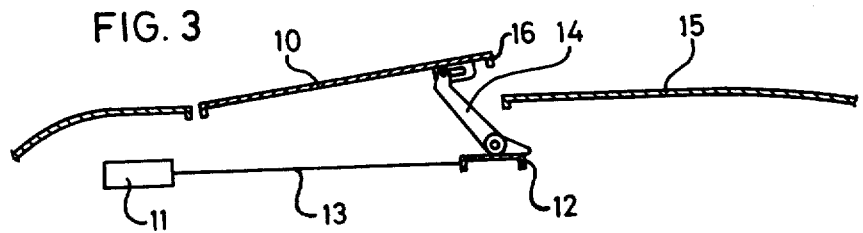
FIG. 3 shows a section according to FIG. 1, with a tilted-out cover.

FIG. 1 shows a cover 10 of a sliding-lifting roof in a fully pushed-back position. The adjusting movement of the cover takes place by means of a crank drive diagrammatically shown at 11, which is in operating connection with a transport bridge 12 by means of pressure-resistant threaded cables or similar means. When the crank drive 11 is operated, the cover 10 can be brought into the closed position shown in FIG. 2, in which the cover, by means of a tilting lever 14, is lifted so far that its upper side is aligned with the upper side of the stationary roof surface 15. When the transport bridge 12 is moved further forward, the rear edge 16 of the cover 10 can be tilted out over the stationary roof surface 15 so that the cover 10 takes over the function of a ventilator. To this extent, the arrangement represented by FIGS. 1-3 is known.

Figure 4:
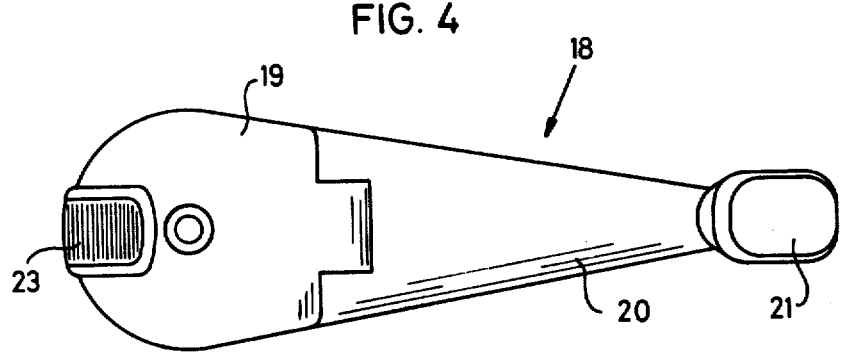
FIG. 4 is a view from below of the crank provided in the arrangement according to FIGS. 1 to 3.
Figure 5:
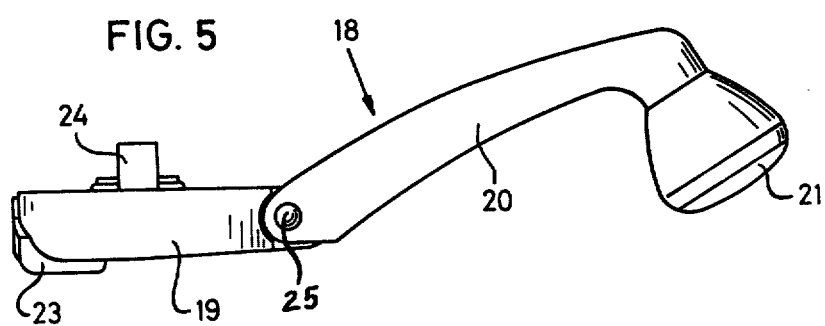
FIG. 5 is a lateral view of the crank.
Figure 6:
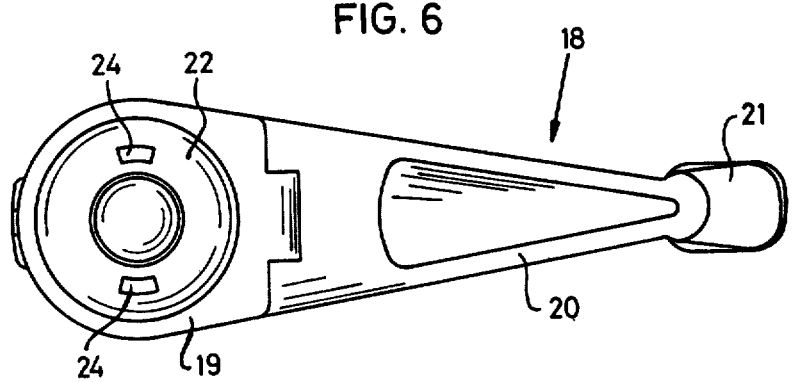
FIG. 6 is a plan view of the crank.

The crank drive 11 has a crank 18 according to FIGS. 4 to 6. These figures show a crank chamber part 19; a crank arm 20 hinged to the crank chamber part 19, and having an operating knob 21; a support 22; and a slide 23. The support 22 has two noses 24 projecting upward, by means of which the support is secured with respect to rotation to a fastening means (not shown) that is firmly connected with the roof surface 15. The crank arm 20 normally assumes the tilted-upward out-of-operation position according to FIG. 5, in which the crank arm 20 disappears in a depression of a roof lining or a casing. For adjusting the position of the cover, the crank arm is folded downward around a hinge-type joint 25.

As shown in FIGS. 7 to 13, the crank chamber part 19 is disposed on the support 22 so that it can be rotated around an essentially vertical rotational axis of the crank. The support 22 is essentially ring-shaped, and is fully received within a ring duct 26 of the crank chamber part 19 in a manner so as to function as a bearing member. The ring duct 26 is inwardly bounded by an outer surface of a central pivot pin 27 of the crank chamber part 19, and is outwardly bounded by a correspondingly concentric inner surface of the outer wall 28 of the crank chamber part 19. In this manner, the crank chamber part 19 is rotatably supported at the outer surface 29 of support 22 as well as at the corresponding concentric inside wall surface 30 of the ring borehole of the support 22. The support 22 and the crank chamber part 19 are held together by a safety ring 31 which engages into an annular groove in the pivot pin 27 and engages against the upperside of the support 22. The support 22 has an internal toothing 33 (FIGS. 10 and 12) that is concentric with respect to the rotational axis of the crank. A toothed ring 34, with an external toothing 36, is in mating engagement with the internal toothing 33. In the case of the illustrated embodiment of the crank 18, the toothed ring 34 is rotatably disposed at the bottom of the crank chamber part 19 on an eccentric 35, which is unitarily connected with the pivot pin 27. The rotational axis formed by the eccentric 35 is, with respect to the rotating axis of the crank, displaced by an amount that is about equal to the difference of the radii of the tooth root circles of the internal toothing 33 and the external toothing of the toothed ring 34.

The toothed ring 34 is, by means of a carrier 38 projecting from the toothed ring, rotationally connected with a control disk 37. The control disk 37 is, by means of the toothed ring 34, disposed on the pivot pin 27 so that it can be rotated around the axis of rotation of the crank. The carrier 38 engages into a recess 39 of the control disk 37, the radial dimension of which is such that it permits the eccentric movement of the toothed ring 34 by permitting radial movement thereof with respect to the control disk 37 that axially rests against it. The control disk 37 has a nose 40, projecting in an axial direction, which engages into an annular groove 41 of the support 22 that extends over an angle of less than 360°. In the illustrated embodiment, the annular groove 41 extends over an angle of about 180°. The nose 40 and the annular groove 41 represent first stop means and respective counter-stop means for limiting the rotating movement of the crank 18 in crank positions that correspond to the fully pushed-back and the fully tilted-out position of the cover 10.

Figure 7:
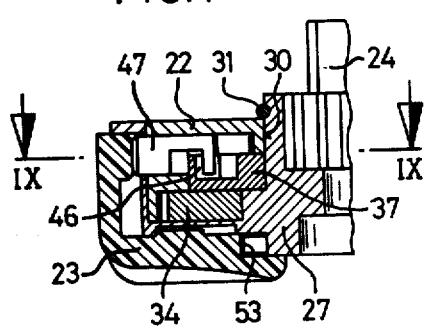
FIG. 7 is a section along Line VII—VII of FIG. 9.
Figure 8:
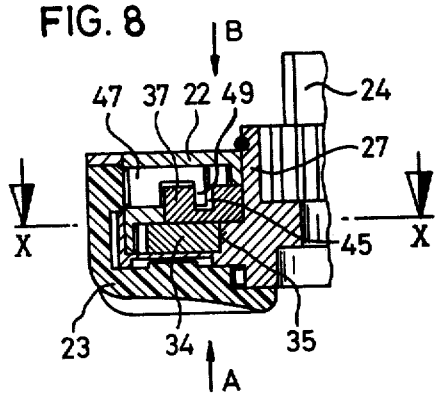
FIG. 8 shows a section similar to FIG. 7, with the slide being pressed radially to the inside.
Figure 9:
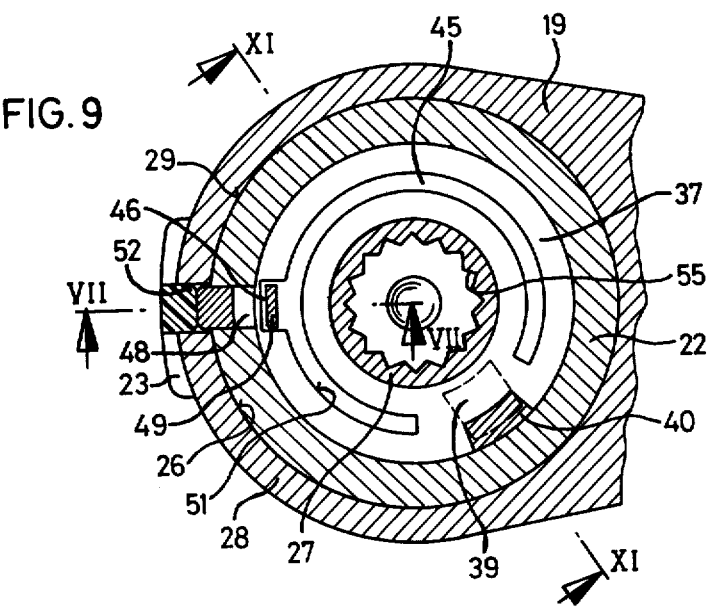
FIG. 9 shows a section through the crank along Line IX—IX of FIG. 7.
Figure 10:
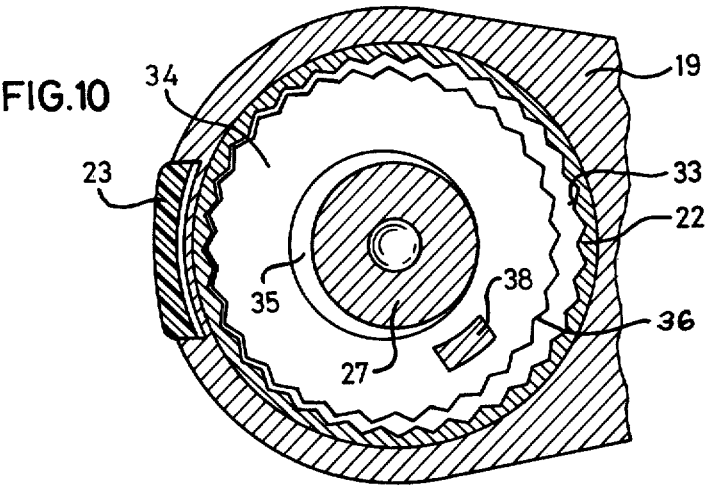
FIG. 10 shows a section along Line X—X of FIG. 8.
Figure 11:
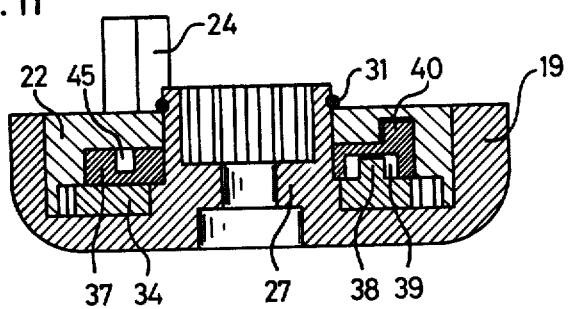
FIG. 11 shows a section along Line XI—XI of FIG. 9.
Figure 12:
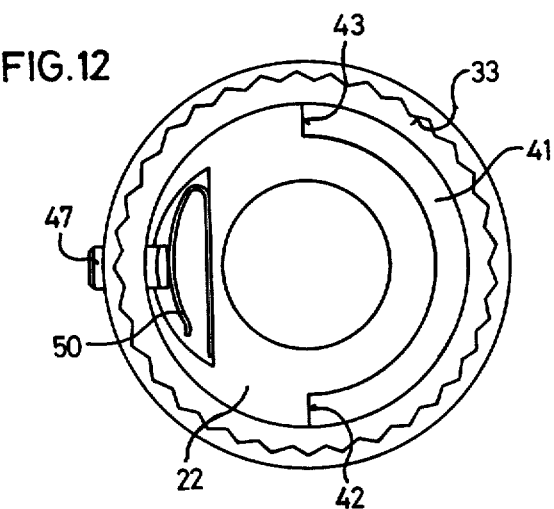
FIG. 12 shows a plan view of the support and the control disk from the direction of Arrow A of FIG. 8.
Figure 13:
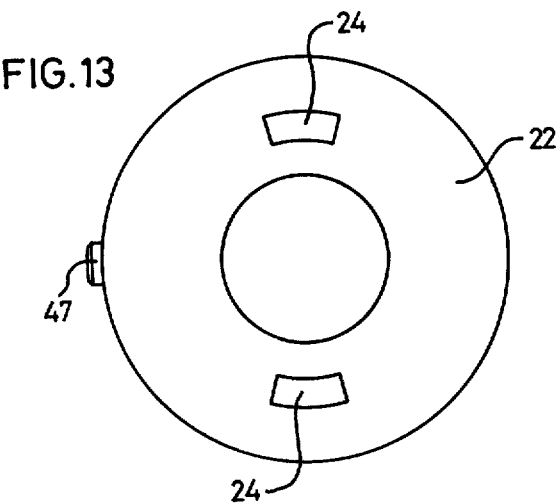
FIG. 13 shows a plan view of the support from the direction of Arrow B of FIG. 8.

In the fully pushed-back position of the cover according to FIG. 1, the nose 40 rests against one end 42 of the annular groove 41, while the nose 40, in the tilted-out position of the cover 10 according to FIG. 3, butts against the other end 43 of the annular groove 41. The control disk 37 has a control duct 45 provided with a notch-like radially widened portion 46 (FIG. 9). A stop member 47 is radially adjustably disposed in a borehole 48 of the crank chamber part 19. The stop member 47 has a nose 49 engaging in the control duct 45. A flat spring 50, inserted into the support 22, biases the stop member 47 radially outwardly. Normally, i.e., in all positions of the cover 10 that do not correspond to the closed position of FIG. 2, the stop member 47 is prevented from being shifted radially outwardly by spring 50 due to the fact that the nose 49 rests against the radially outer wall 51 of the control duct 45. However, when the crank 18 reaches a position that corresponds to the closed position of the cover 10 (FIG. 2), the stop member 47 is aligned with the widened portion 46 of the control duct 45 so that the stop member 47 is released for movement within a recess 52 of the crank chamber part 19. As a result, the spring 50 pushes the stop member 47 radially outwardly (FIGS. 7 and 9). In this manner, the stop member 47 and the recess 52 form second stop means and counter-stop means, respectively, for the releasable locking of the crank 18 in a crank position that corresponds to the closed position of the cover 10. For unlocking the stop member 47, the slide 23 is used which is radially outwardly biased by a flat spring 53 that is supported between the pivot pin 27 and slide 23. By adjusting the slide 23, the stop member 47 can be disengaged from the recess 52 of the crank chamber part 19 and from widened portion 46 of the control duct 45.

In its upper part, the pivot pin 27 has an internal toothing 55. A pinion shaft (not shown) with an external toothing can be engaged with said internal toothing 55, with the pinion shaft carrying a pinion for the drive of the threaded cable 13.

The above-described arrangement operates as follows: In the closed position of the cover 10 (FIG. 2), the crank 18 is locked by the fact that the stop member 47 engages in the recess 52 of the crank chamber part 19 (FIGS. 7 and 9). In order to push the cover 10 back from this position, the slide 23 is pressed radially inward until the stop member 47 disengages from the recess 52. The crank 18 is turned and the toothed ring 34 is caused to make a circulating movement. By means of the carrier 38, the toothed ring 34 takes along the control disk 37. The nose 49 of the stop member 47 rests against the outer wall 51 of the control duct 45, preventing the stop pin 47 from again falling into the recess 52 when, during the turning of the crank 18, the stop pin passes the recess 52. The crank may now make several rotations until the nose 40 of the control disk 37 butts against the end 42 of the annular groove 41 of the support 22. The cover 10 has now reached its fully pushed-back position (FIG. 1). When the crank is turned in the opposite direction, the cover 10 is shifted in the direction of the closed position. As soon as this position has been reached, the stop member 47 is released by the widened portion 46 of the control duct 45, so that it engages in the recess 52. The crank is locked. By pressing the slide 23, this locking may, again, be released. If the turning of the crank is now continued in the same direction, a tilting-out of the cover 10 takes place. When the fully tilted-out position of the cover 10 is reached (FIG. 3), a continued turning of the crank is prevented by the fact that the nose 40 of the control disk 37 strikes against the end 43 of the annular groove 41.

Within the framework of the invention, numerous modifications of the described preferred embodiment are possible. For example, a nose, that in regard to function corresponds to the nose 40 of the control disk, may be provided at the bottom side of the toothed ring 34, while an annular groove interacting with said nose, that has the function of the groove 41, may be provided in a stationary component. In the case of such an embodiment, the control disk 37 is only used for the control of the stop member 47.

According to a further modified embodiment, the toothed ring 34 and the control disk 37 may be unitarily connected with one another so that the control disk 37 also carries out an eccentric circulating movement. It is understood that, in this case, the control duct 45 must have a shape that permits such a circulating movement.

While we have described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A crank drive for controlling sliding movement and tilting movement of a cover of sliding-lifting roofs of motor vehicles, comprising:
   A. a rotatable crank;
   B. a stationary support having an internal toothing and disposed concentrically with respect to an axis of rotation of said rotatable crank;
   C. an eccentric connected to said rotatable crank for rotation therewith;
   D. a toothed ring having an external toothing disposed on said eccentric for mating engagement with the internal toothing of said stationary support and for rotation about an axis which is displaced from said axis of rotation of the crank by an amount that is approximately equal to the difference between tooth-root circle radii of said internal and external toothings;
   E. first stop means for limiting rotation of said crank at crank positions corresponding to fully pushed-back and fully tilted-out positions of the cover, said stop means being connected to said toothed ring for rotation therewith; and
   F. second stop means for releasably locking said crank in a crank position corresponding to a fully closed position of the cover, said second stop means being connected to said stationary support in a manner preventing relative rotation therebetween;
   wherein said rotatable crank is provided with a crank chamber part within which said toothed ring, said eccentric and second stop means are housed, and wherein said stationary support is concentrically enclosed by said crank chamber part in a bearing relationship therewith.

2. A crank drive according to claim 1, wherein said stationary support is essentially ring-shaped and is housed in a ring duct of the crank chamber part.

3. A crank drive according to claim 2, wherein the crank chamber part is rotatably supported by the stationary support at an outer surface of the stationary support as well as by means of a central pivot pin thereof at a correspondingly concentric inside surface of a ring borehole of said stationary support.

4. A crank drive according to claim 3, wherein the eccentric is rigidly connected with the pivot pin of the crank chamber part.

5. A crank drive according to claim 4, wherein the eccentric is disposed at the bottom of the ring duct.

6. A crank drive according to claim 1, further comprising a control disk connected to the toothed ring for rotation therewith, wherein the first stop means is disposed on said control disk and interacts with a counter-stop means formed on the stationary support.

7. A crank drive according to claim 6, wherein the first stop means is formed by a nose on the control disk which projects in axial direction, said nose engaging in an annular slot in the support comprising the counter-stop means, said slot extending over an angle of less than 360°.

8. A crank drive according to claim 7, wherein the toothed ring and the control disk are rotationally connected by means of a carrier, and the control disk is disposed for rotation about the axis of rotation of the crank.

9. A crank drive according to claim 6, wherein the toothed ring and the control disk are rotatably connected by means of a carrier, and the control disk is disposed for rotation about the axis of rotation of the crank.

10. A crank drive according to claim 9, wherein the crank chamber part is rotatably supported by the stationary support at an outer surface of the stationary support as well as by means of a central pivot pin thereof at a correspondingly concentric inside surface of a ring borehole of said stationary support, and wherein the control disk is disposed on the central pivot pin of the crank chamber part in a manner axially resting against the toothed ring.

11. A crank drive according to claim 8, wherein the crank chamber part is rotatably supported by the stationary support at an outer surface of the stationary support as well as by means of a central pivot pin thereof at a correspondingly concentric inside surface of a ring borehole of said stationary support, and wherein the control disk is disposed on the central pivot pin of the crank chamber part in a manner axially resting against the toothed ring.

12. A crank drive according to claim 11, wherein a recess in the crank chamber part is provided as counter-stop means for the second stop means, and the control disk has a control duct dimensioned so that it releases the second stop means, only in the crank position corresponding to the closed position of the cover, for engagement with the recess of the crank chamber part.

13. A crank drive according to claim 12, wherein the second stop means are formed by a stop member radially displaceably disposed in the crank chamber part, with said stop member being biased outwardly in an elastic manner and being provided with a nose engaging in the control duct in order to hold the stop member, against the outward bias, in a position that is radially inwardly pulled back relative to said recess, and wherein the control duct has a radially widened portion for enabling the stop member to engage in the recess of the crank chamber part.

14. A crank drive according to claim 12, wherein a slide is provided that is operable from the outside of the crank chamber part, is adjustable in a radial direction and is, in an elastic manner, radially outwardly biased, said slide being operable for disengaging the stop member from the recess of the crank chamber part.

* * * * *